United States Patent
Sayama (10) Patent No.: US 7,154,194 B2
(45) Date of Patent: Dec. 26, 2006

(54) POWER CIRCUIT OF A VEHICULAR ELECTRONIC CONTROL UNIT

(75) Inventor: Masahiko Sayama, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 456 days.

(21) Appl. No.: 10/802,731

(22) Filed: Mar. 18, 2004

(65) Prior Publication Data

US 2005/0052081 A1 Mar. 10, 2005

(30) Foreign Application Priority Data

Sep. 5, 2003 (JP) ............................ P2003-314223

(51) Int. Cl.
*H02J 1/10* (2006.01)
(52) U.S. Cl. ...................................... 307/43
(58) Field of Classification Search .................. 307/43
See application file for complete search history.

(56) References Cited

U.S. PATENT DOCUMENTS

2003/0051540 A1 3/2003 Morinaga et al.

FOREIGN PATENT DOCUMENTS

| DE | 101 33 802 C1 | 12/2002 |
|----|---------------|---------|
| JP | 5-18315 A | 1/1993 |
| JP | 2003-74421 A | 3/2003 |

*Primary Examiner*—Stephen W. Jackson
*Assistant Examiner*—Carlos Amaya
(74) *Attorney, Agent, or Firm*—Sughrue Mion, PLLC (57) ABSTRACT

A power circuit of a vehicular electronic control unit is provided with a constant voltage power circuit, an awakening timer circuit, and first and second power supply circuits each of which is supplied with power from a vehicle battery. The constant voltage power circuit is supplied with power from the vehicle battery via the first and second power supply circuits. The awakening timer circuit generates an awakening trigger signal upon a lapse of a prescribed time from a stop of power supply to the microprocessor. The first power supply circuit has an output contact as a first opening/closing element and a coil for closing the output contact. The second power supply circuit has a second opening/closing element that is provided between the vehicle battery and the constant voltage power circuit and is closed at least in response to the awakening trigger signal.

9 Claims, 2 Drawing Sheets

POWER CIRCUIT OF A VEHICULAR ELECTRONIC CONTROL UNIT

BACKGROUND OF THE INVENTION

1. Field of the Invention

The present invention relates to a power circuit of a vehicular electronic control unit incorporating a microprocessor for performing, for example, an ignition control and a fuel injection control on a vehicle engine. In particular, the invention relates to improvement of a power circuit for supplying control power to a vehicular electronic control unit exceptionally in spite of a power switch's being in an off-state.

2. Description of the Related Art

A technique of using both of a sleep power circuit and a control power circuit as power circuits of a vehicular electronic control unit are widely put in practical use. The sleep power circuit directly connects a vehicle battery to the vehicular electronic control unit to maintain data stored in a RAM that cooperates with a microprocessor that is incorporated in the vehicular electronic control unit. The control power circuit connects the vehicle battery to the vehicular electronic control unit at the output contact of an electromagnetic relay having a coil that is energized by the vehicle battery via a power switch.

Once activated, the electromagnetic relay is supplied with an operation maintenance signal from the microprocessor and continues its relaying state until the microprocessor completes various save controls even if the power switch is turned off. This kind of power supply state is called sleep power supply.

As exemplified above, many methods for continuing supply of power for a prescribed time after turning-off of a power switch have been proposed. For example, Japanese patent application JP-A-5-18315 (assigned to the same assignee of this application) discloses a concept that power shutoff of a vehicular electronic control unit (ECU) is delayed to allow recovery, to an initial position, of a stepping motor that is one of vehicle electric loads. The delay of power shutoff secures a time to transfer part of learned information stored in a RAM to a nonvolatile memory such as an EEPROM and make it stored there.

Another prior art technique for supplying control power to a vehicular electronic control unit though a power switch is in an off-state is disclosed in Japanese patent application JP-A-2003-74421 (assigned to DENSO CORP). That is, JP-A-2003-74421 discloses what is called a regular activation concept that a vehicular computer is supplied with power every predetermined time after a stop of the engine, whereby the states of particular sensors such as a fuel tank internal pressure sensor, a remaining fuel sensor, and a tank internal temperature sensor are monitored and occurrence/non-occurrence of fuel leakage or transpiration is judged.

In the techniques of JP-A-5-18315 and patent JP-A-2003-74421, the delayed power shutoff or the regular activation is performed individually, that is, the power circuit is not configured so that both of the delayed power shutoff and the regular activation can be performed in parallel. The technique of JP-A-5-18315 has a problem that if the microprocessor is activated regularly while the power switch is off, unnecessary power supply to various vehicle electric loads occurs to increase the consumption of current supplied from the vehicle battery.

In the power circuit of JP-A-2003-74421, vehicle electric loads are supplied with power directly from the power switch. Therefore, the power switch needs to deal with a large current and the delayed power shutoff cannot be performed.

SUMMARY OF THE INVENTION

A first object of the present invention is therefore to provide a safe power circuit that makes control power for a vehicular electronic control unit effective while a power switch is off and that has functions of delayed power shutoff and regular activation.

A second object of the invention is to provide a power circuit that supplies performs power supply to vehicle electric loads and power supply to a vehicular electronic control unit in a unified manner while the vehicle is driven and that prevents an event that power is supplied to only one of the vehicular electronic control unit and the vehicle electric loads at the occurrence of an abnormality.

To attain the above objects, the invention provides a power circuit of a vehicular electronic control unit having a microprocessor that is supplied with power from a vehicle battery and that drives various electric loads in accordance with the operation states of various input sensors that generate an on/off signal or an analog signal and the contents of a program memory. The vehicular electronic control unit is provided with a constant voltage power circuit, an awakening timer circuit, and first and second power supply circuits.

The constant voltage power circuit is supplied with power from the vehicle battery via the first or second power supply circuit, and supplies a prescribed regulated voltage to the microprocessor, the devices accompanying the microprocessor such as a program memory and a RAM for computation, and input/output interface circuits.

The awakening timer circuit is supplied with power directly from the vehicle battery and generates an awakening trigger signal upon a lapse of a prescribed time from a stop of power supply to the microprocessor. The awakening timer circuit employs power-saving-type circuit elements.

The first power supply circuit is provided with a power relay having an output contact as a first opening/closing element provided between the vehicle battery and the constant voltage power circuit/various electric loads and a coil for closing the output contact, and a reverse-blocking diode that is connected in series to the output contact. The coil is energized when the power switch is closed, that is, manipulated at a start of driving of the vehicle. Even if the power switch is opened, the coil is kept energized by a power maintenance drive signal that is generated by the microprocessor.

The second power supply circuit is provided with a second opening/closing element that at least connects the vehicle battery and the constant voltage power circuit. The second opening/closing element is closed when an awakening trigger signal is generated, and is kept closed by a power maintenance drive signal that is generated by the microprocessor.

The reverse-blocking diode is in such a connection relationship as to allow power supply from the first power supply circuit to the various electric loads and to prohibit power supply from the second power supply circuit to the various electric loads.

Therefore, during a driving operation of the vehicular electronic control unit, the vehicular electronic control unit and the vehicle electric loads are supplied with power from the single power relay rather than separate power supply circuits. That is, the power circuit is not configured so as to supply power to one of the vehicular electronic control unit and the vehicle electric loads from the power relay when an abnormality occurs in the power circuit. Further, when the vehicular electronic control unit is activated in a state that the power switch is off, the vehicle electric loads are not supplied with power.

In the power circuit of a vehicular electronic control apparatus according to the invention, during a driving operation of the vehicular electronic control unit, the vehicular electronic control unit and the vehicle electric loads are supplied with power from the single power relay rather than separate power supply circuits. Therefore, when a contact failure, a welding abnormality, or the like has occurred in the power relay, it is not necessary to perform complex processing. The driver can easily recognize and deal with such a contact failure or welding abnormality.

When the vehicular electronic control unit is activated by an awakening operation in a state that the driver is absent and the power switch is off, the vehicle electric loads are not supplied with power. Therefore, the consumption of power that is supplied from the vehicle battery can be reduced and a burning damage accident caused by occurrence of an abnormality can be prevented.

DESCRIPTION OF THE PREFERRED EMBODIMENTS

Embodiment 1

Figure 1:
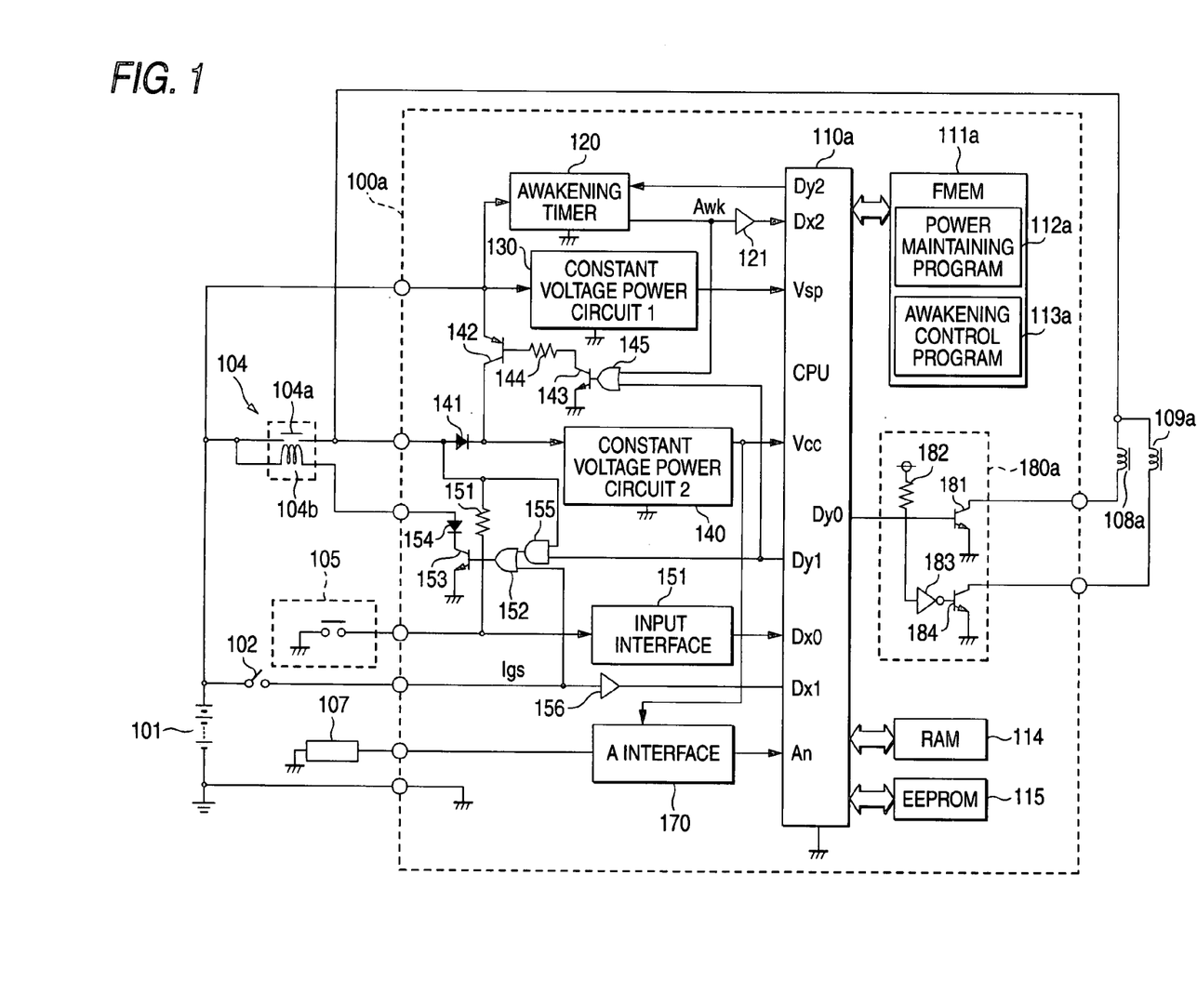
FIG. 1 is a circuit diagram showing the configuration of the entire power circuit of a vehicular electronic control unit according to a first embodiment of the invention.

FIG. 1 is a circuit diagram showing the configuration of the entire power circuit of a vehicular electronic control unit according to a first embodiment of the invention. The configuration of the power circuit will be described below in detail.

In FIG. 1, reference symbol 100a denotes a vehicular electronic control unit that is housed in a tightly closed case and connected to external devices described below.

Reference symbol 101 denotes a DC 12 V system vehicle battery; 102, a power switch such as an ignition switch that is manipulated when driving of the vehicle is started or stopped; 104, a power relay having an output contact 104a and a coil 104b; 105, various input sensors that perform on/off operations such as an engine rotation sensor, a crank angle sensor, a vehicle speed sensor, and a shift switch for detecting a shift lever position of the transmission; 107, various analog input sensors such as an accelerator position sensor for detecting a degree of pedaling on the accelerator, a throttle position sensor for detecting a degree of opening of a throttle valve, an air flow sensor that is attached to an intake pipe, an exhaust gas sensor, a fuel tank temperature sensor, remaining fuel sensor, and pressure sensor, a cooling water sensor, and a cylinder pressure sensor; and 108a and 109a, many vehicle electric loads such as an energization coil of a stepping motor. Other vehicle electric loads include ignition coils and a fuel injection electromagnetic valve throttle control motor.

Next, the internal configuration of the vehicular electronic control unit 100a will be described. Reference symbol 110a denotes a microprocessor; 111a, a program memory such as a flash memory that is bus-connected to the microprocessor 110a; 112a, a control program as a power maintaining means (described later) that is stored in the program memory 111a; 113a, a control program as an awakening control means (described later) that is stored in the program memory 111a; 114, a RAM for computation that is bus-connected to the microprocessor 110a; and 115, a nonvolatile data memory such as an EEPROM that is serially connected to the microprocessor 110a and on which reading and writing can be performed electrically.

Reference numeral 120 denotes an awakening timer circuit using low-power-consumption field-effect transistors as used in calendar clocks. Supplied with power directly from the vehicle battery 101, the awakening timer circuit 120 starts a timer operation upon instantaneously receiving a timer operation start instruction signal Dy2 that is generated by the microprocessor 110a. Upon a lapse of a preset, prescribed time, the awakening timer circuit 120 generates an awakening trigger signal Awk, which is supplied to an input of an OR element 145 (described later) and is also supplied to a second input circuit 121, which, in response, supplies a second power control signal Dx2 to the microprocessor 110a.

Reference numeral 130 denotes a memory retention power circuit that is supplied with power directly from the vehicle battery 101. Incorporating a high-resistance input resistor and a constant voltage control circuit (not shown), the memory retention power circuit 130 serves as a low-power-consumption power source for supplying a retention voltage Vsp to be used for maintaining the storage contents of the RAM 114 even while a circuit (described later) for supplying power to the vehicular electronic control unit 100a is off. Reference numeral 140 denotes a constant voltage power circuit for supplying main power. The constant voltage power circuit 140 is supplied with power from the vehicle battery 101 via the output contact 104a as a first opening/closing element and a reverse-blocking diode 141, and generates a constant voltage Vcc of DC 5 V, for example.

The constant voltage power circuit 140 supplies a prescribed regulated voltage to the microprocessor 110a, the devices accompanying the microprocessor 110a such as the program memory 111a, the RAM 114 for computation, and the nonvolatile data memory 115, and input/output interface circuits 150, 170, and 180a (described later).

Reference numeral 150 denotes the input interface circuit that is provided between the various input sensors 105 that perform on/off operations and a digital input port Dx0 of the microprocessor 110a. Reference numeral 151 denotes a bleeder resistor that is provided between the connecting point of the output contact 104a and the reverse-blocking diode 141 and the various input sensors 105. The input interface circuit 150 level-converts DC 12 V as an input signal voltage into DC 5 V and incorporates a capacitor as a noise filter.

It is intended that a relatively large current flows through the bleeder resistor 151 to prevent a contact failure at the contact by causing a flow of a sufficiently large contact current when an input sensor 105 is closed, and to suppress noise occurring on the signal lines even in the case where the input sensors 105 are transistor switches. When an input sensor 105 is opened, the bleeder resistor 151 pulls up its voltage to the positive side (i.e., to the voltage of the vehicle battery 101).

Reference numeral 152 denotes an OR circuit that receives, as inputs, a first logical signal that is an output of an AND circuit 155 (described later) and a second logical signal that is an opening/closing signal Igs of the power switch 102. Reference numeral 153 is a drive transistor that is turned on when the output of the OR circuit 152 has a logical level "H." Reference numeral 154 denotes a reverse connection protective diode that is connected in series with the drive transistor 153. The coil 104b of the power relay 104 is supplied with power from the vehicle battery 101 via the reverse connection protective diode 154 and the drive transistor 153.

Reference numeral 155 denotes the AND circuit. One input of the AND circuit 155 is connected to the connecting point of the output contact 104a and the reverse-blocking diode 141, and the other input is connected to a power maintenance drive output Dy1 that is an output terminal of the microprocessor 110a. Reference numeral 156 denotes a first input circuit that supplies the opening/closing signal Igs of the power switch 102 to the microprocessor 110a as a first power control signal Dx1.

Reference numeral 170 denotes an analog input interface circuit that is provided between the analog input sensors 107 and an analog input port An of the microprocessor 110a. The analog input interface circuit 170 incorporates a clip diode for causing positive or negative high-voltage noise occurring on the input lines to go out to the power circuit and a capacitor as a noise filter. An analog signal voltage of 0 to 5 V, for example, that is input through the analog input port An is converted into a digital signal by a multi-channel AD converter that is incorporated in the microprocessor 110a.

Reference symbol 180a denotes an output interface circuit that is provided between a digital output port Dy0 of the microprocessor 110a and the vehicle electric loads 108a and 109a. The output interface circuit 180a is equipped with a drive transistor 181, a pull-up resistor 182, a logical inverter circuit 183, an inverting drive transistor 184, etc. When the digital output port Dy0 has a logical level "H," the drive transistor 181 is turned on to supply power to the electric load 108a. When the digital output port Dy0 has a logical level "L," the drive transistor 184 is turned on to supply power to the electric load 109a.

Next, Operation of Embodiment 1 Will be Described.

In the above-configured circuit of FIG. 1, when the power switch 102 is closed, power is supplied from the vehicle battery 101 to the coil 104b via the reverse connection protective diode 154 and the drive transistor 153 that has been turned on by the OR circuit 152, whereby the output contact 104a of the power relay 104 is closed.

However, if the vehicle battery 101 is set in the opposite way in polarities, the reverse connection protective diode 154 prevents power supply to the coil 104 band hence the output contact 104a is not closed.

When the output contact 104a is closed (the vehicle battery 101 is set correctly in polarities), the constant voltage power circuit 140 is activated via the reverse-blocking diode 141 and generates a prescribed constant voltage Vcc, whereupon the microprocessor 110a starts to operate.

As a result, first, a power maintenance drive signal Dy1 is generated as a result of functioning of the power maintaining means 112a, whereby the drive transistor 153 is kept conductive via the AND circuit 155 and the OR circuit 152. Therefore, the relaying state of the power relay 104 is maintained even if the power switch 102 is opened afterwards.

While the power switch 102 is closed and a first power control signal Dx1 that is supplied to the microprocessor 110a via the first input circuit 156 has a logical level "H,"
the microprocessor 110a drive-controls the various electric loads 108a and 109a in accordance with the operation states of the various input sensors 105 that perform on/off operations, the signal voltage levels of the various analog input sensors 107, and the contents of the program memory 111a.

However, when the power switch 102 is opened, the logical level of the first power control signal Dx1 is changed from "H" to "L." The microprocessor 110a performs save controls, for example, saves part of learned data etc. of the RAM 114 into the nonvolatile memory 115 and returns the operation states of the electric loads 108a and 109a to initial states, and then causes the power maintaining means 112a to stop the output of the power maintenance drive signal Dy1. As a result, the drive transistor 153 is turned off and the power relay 104 is de-energized. The output voltage of the constant voltage power circuit 140 disappears and the microprocessor 110a stops its operation.

However, immediately before the output of the power maintenance drive signal Dy1 is stopped, the awakening control means 113a causes generation a timer operation start instruction signal Dy2 and the awakening timer circuit 120 is thereby prepared for a start of a timer operation.

Therefore, upon a lapse of a preset time of the awakening timer circuit 120 from the stop of operation of the microprocessor 110a, the awakening timer circuit 120 generates an awakening trigger signal Awk, whereupon a transistor 142 as a second opening/closing element is turned on via an OR element 145 and a drive transistor 143. As a result, power is supplied from the vehicle battery 101 to the constant voltage power circuit 140 via the transistor 142. The constant voltage power circuit 140 generates a prescribed constant voltage Vcc, whereby the microprocessor 110a starts to operate.

The microprocessor 110a thus supplied with power judges that an awakening operation state is established on the basis of the facts that the first power control signal Dx1 has a logical level "L" (i.e., the power switch 102 is off) and that the second power control signal Dx2 has a logical level "H." First, the microprocessor 110a generates a power maintenance drive signal Dy1 so that the transistor 142 will be kept conductive by the OR element 145 even after the output of the awakening trigger signal Awk is stopped.

Then, the microprocessor 110a stores states of predetermined, particular input signals in the RAM 114 and judges whether to perform an awakening operation again.

As for the necessity of continuation of the awakening operation, the microprocessor 110a judges that the awakening operation need not be continued if a subsequent input monitoring operation is unnecessary when a judgment result "normal" is produced because of no decrease in the fuel tank internal pressure after a lapse of a sufficient time from a stop of the engine or when a judgment result "leakage abnormality" is produced because of an abnormal decrease in the fuel tank internal pressure.

After reading and storing the states of the particular input signals and performing the judgment processing, the microprocessor 110a stops the output of the power maintenance drive signal Dy1. Since the transistor 142 is turned off, the output of the constant voltage power circuit 140 disappears and hence the microprocessor 110a stops its operation.

However, if it is necessary to perform an awakening operation again, the microprocessor 110a generates a timer operation start instruction signal Dy2 and thereby starts operation of the awakening timer circuit 120 immediately before stopping the output of the power maintenance drive signal Dy1.

Even if a power maintenance drive signal Dy1 is generated in an awakening operation, the power relay 104 is not activated because the output contact 104a is opened and hence the output of the AND circuit 155 has a logical level "L."

Therefore, the various electric loads 108a and 109a are not driven in an awakening operation and the consumption of power supplied from the vehicle battery 101 is reduced accordingly.

In this embodiment, since the bleeder resistor 151 is supplied with power from the connecting point of the output contact 104a and the reverse-blocking diode 141, operation states of the input sensors 105 that perform on/off operations cannot be read at the stage of an awakening operation.

As is understood from the above description, the power circuit according to the first embodiment of the invention is a power circuit of the vehicular electronic control unit 100a having the microprocessor 110a that is supplied with power from the vehicle battery 101 and that drives the various electric loads 108a and 109a in accordance with the operation states of the various input sensors 105 that generate on/off signals or the various input sensors 107 that generate analog signals and the contents of the program memory 111a. The vehicular electronic control unit 100a is provided with the constant voltage power circuit 140, the awakening timer circuit 120, and first and second power supply circuits.

The constant voltage power circuit 140 is supplied with power from the vehicle battery 101 via the first opening/closing element (i.e., output contact 104a; part of the first power supply circuit) or the second opening/closing element 142 (part of the second power supply circuit), and supplies a prescribed regulated voltage to the microprocessor 110a, the devices accompanying the microprocessor 110a such as the program memory 111a, the RAM 114 for computation, and the nonvolatile data memory 115, and the input/output interface circuits 150, 170, and 180a.

The awakening timer circuit 120 is supplied with power directly from the vehicle battery 101 and generates an awakening trigger signal Awk upon a lapse of a prescribed time from a stop of power supply to the microprocessor 110a. The awakening timer circuit 120 employs power-saving-type circuit elements.

The first power supply circuit is provided with the power relay 104 having the output contact 104a (i.e., first opening/closing element) provided between the vehicle battery 101 and the constant voltage power circuit 140/various electric loads 108a and 109a and the coil 104b for closing the output contact 104a, and the reverse-blocking diode 141 that is connected in series to the output contact 104a. The coil 104b is energized when the power switch 102 is closed, that is, manipulated at a start of driving of the vehicle. Even if the power switch 102 is opened, the coil 104b is kept energized by a power maintenance drive signal Dy1 that is generated by the microprocessor 110a.

The second power supply circuit is provided with the second opening/closing element 142 that at least connects the vehicle battery 101 and the constant voltage power circuit 140. The second opening/closing element 142 is closed when an awakening trigger signal Awk is generated, and is kept closed by a power maintenance drive signal Dy1 that is generated by the microprocessor 110a.

The reverse-blocking diode 141 is in such a connection relationship as to allow power supply to the various electric loads 108a and 109a via the output contact 104a which is part of the first power supply circuit and to prevent power supply to the various electric loads 108a and 109a via the second opening/closing element 142 which is part of the second power supply circuit.

Therefore, during a driving operation of the vehicular electronic control unit 100a, the vehicular electronic control unit 100a and the vehicle electric loads 108a and 109a are supplied with power from the single power relay 104. That is, the power circuit is not configured so as to supply power to one of the vehicular electronic control unit 100a and the vehicle electric loads 108a and 109a from the power relay 104. Further, when the vehicular electronic control unit 100a is activated in a state that the power switch 102 is off, the vehicle electric loads 108a and 109a are not supplied with power.

Further, the vehicular electronic control unit 100a according to the first embodiment of the invention is housed in a tightly closed case. The power relay 104 is provided outside the tightly closed case whereas the second opening/closing element is the transistor 142 that is provided inside the tightly closed case.

Whereas the second opening/closing element 142, which is a novel feature of the invention, is a long-life, contactless element and is incorporated in the vehicular electronic control unit 100a, the power relay 104 having a limited life is provided outside the tightly closed case to facilitate its maintenance and replacement.

Further, in the vehicular electronic control unit 100a according to the first embodiment of the invention, first and second power control signals Dx1 and Dx2 are input to the microprocessor 110a and the program 112a as the power maintaining means is stored in the program memory 111a.

The first power control signal Dx1 is an opening/closing signal Igs of the power switch 102 and the second power control signal Dx2 is an awakening trigger signal Awk that is generated by the awakening timer circuit 120. When the power switch 102 is opened, the power maintaining means 112a causes generation of a power maintenance drive signal Dy1 for keeping the power supply through the first power supply circuit during a first period that is necessary for save control processing of the microprocessor 110a. While the power switch 102 is off, the power maintaining means 112a causes generation of a power maintenance drive signal Dy1 for keeping the power supply through the second power supply circuit during a second period for monitoring of the states of particular input signals.

Judging whether the current state is a delayed power shutoff state or an awakening power supply state during a power shutoff on the basis of the first and second power control signals Dx1 and Dx2, the microprocessor 110a can cause the power maintaining means 112a to cause generation of a proper power maintenance drive signal Dy1.

Still further, in the vehicular electronic control unit 100a according to the first embodiment of the invention, the microprocessor 110a inputs a timer operation start instruction signal Dy2 to the awakening timer circuit 120 and the program 113a as the awakening control means is stored in the program memory 111a. The awakening control means 113a causes the next awakening operation by causing generation of a timer operation start instruction signal Dy2 immediately before a stop of generation of a power maintenance drive signal Dy1, and prohibits a subsequent awakening operation by stopping generation of a timer operation start instruction signal Dy2 in accordance with monitoring results of the above-mentioned particular input signals.

If judging that an awakening operation need not be performed, the microprocessor 110a disables operation of the second power supply circuit, whereby the consumption of power supplied from the vehicle battery 101 can be reduced.

Furthermore, in the vehicular electronic control unit 100a according to the first embodiment of the invention, the power maintenance drive signal Dy1 that is output from the microprocessor 110a to the first and second power supply circuits is output from the common output port of the microprocessor 110a and the vehicular electronic control unit 100a is provided with the AND circuit 155 and the OR circuit 152.

The AND circuit 155 generates a first logical signal when the output contact 104a as the first opening/closing element is closed and a power maintenance drive signal Dy1 is generated. The OR circuit 152 calculates the OR of the above first logical signal and a second logical signal that is generated when the power switch 102 is closed. The coil 104b of the power relay 104 is energized by the resulting OR signal of the OR circuit 152.

Since the power relay 104 is not activated unless the power switch 102 is closed even if a power maintenance drive signal Dy1 is generated, the power supply can be maintained by selectively using the first or second power supply circuit and using a single power maintenance drive signal Dy1.

Embodiment 2

Figure 2:
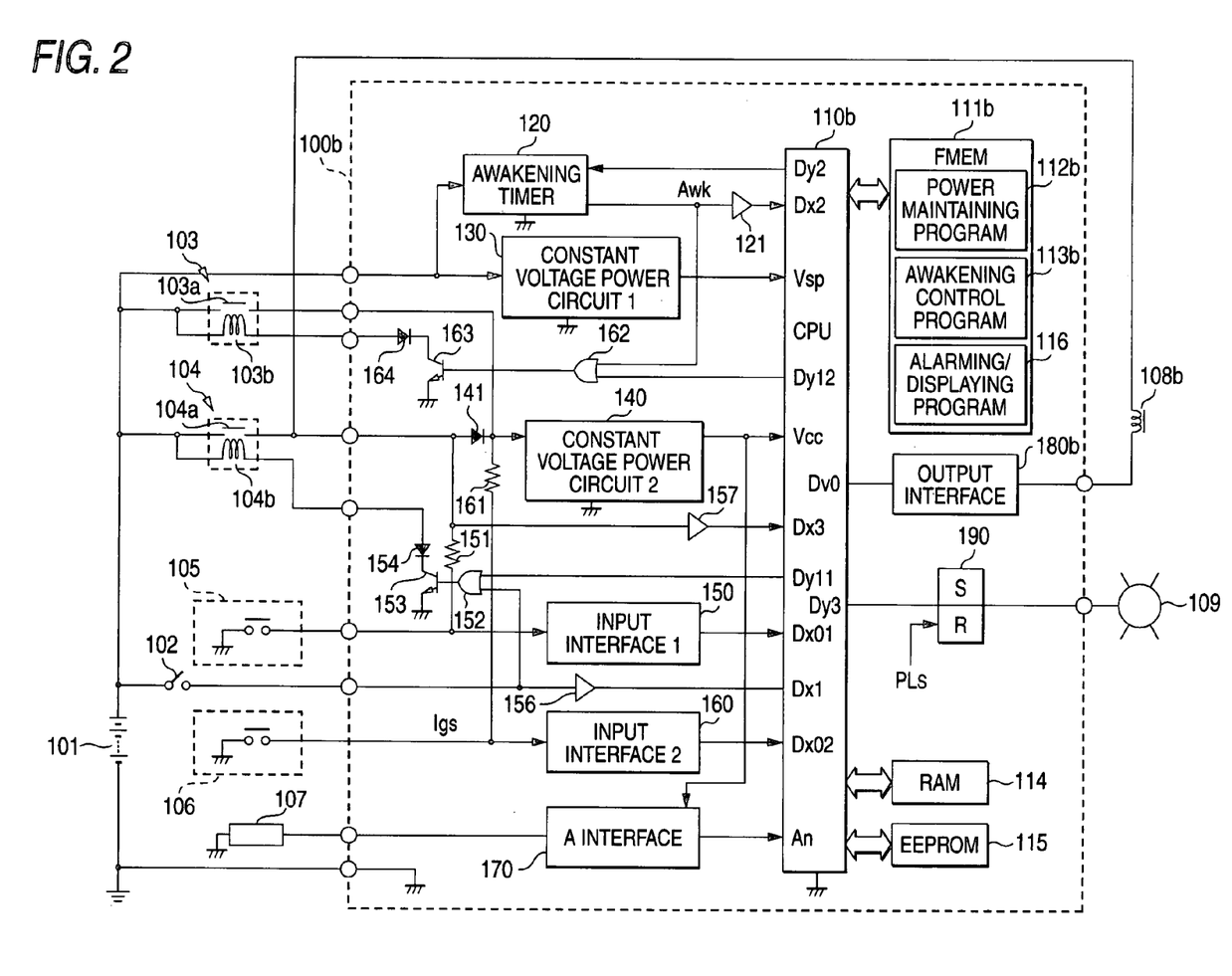
FIG. 2 is a circuit diagram showing the configuration of the entire power circuit of a vehicular electronic control unit according to a second embodiment of the invention.

FIG. 2 is a circuit diagram showing the configuration of the entire power circuit of a vehicular electronic control unit according to a second embodiment of the invention. Differences of this power circuit from the power circuit of FIG. 1 will mainly be described below.

In FIG. 2, reference symbol 100b denotes a vehicular electronic control unit that is housed in a tightly closed case and connected to the following external devices.

As in the case of FIG. 1, reference symbol 101 denotes a vehicle battery; 102, a power switch; 104, a power relay having an output contact 104a and a coil 104b; 105, various input sensors that perform on/off operations; 107, various analog input sensors; and 108b, vehicle electric loads. The various input sensors that perform on/off operations are divided into the various input sensors 105 of a first group and various input sensors 106 of a second group.

The various input sensors 105 of the first group are such a group of input sensors whose operation states need not monitored regularly while the power switch 102 is off. On the other hand, the various input sensors 106 of the second group are such a group of input sensors whose operation states need to be monitored regularly while the power switch 102 is off.

Reference numeral 103 denotes a second power relay having an output contact 103a and a coil 103b. Reference numeral 109 denotes an alarm/display.

As for the internal configuration of the vehicular electronic control unit 100b, reference symbol 110b denotes a microprocessor; 111b, a program memory such as a flash memory that is bus-connected to the microprocessor 110b; 112b, a control program as a power maintaining means (described later) that is stored in the program memory 111b; 113b, a control program as an awakening control means (described later) that is stored in the program memory 111b; 114 and 115, a RAM and a nonvolatile data memory (described in the first embodiment); and 116, a control program as an alarming/displaying means that is stored in the program memory 111b.

Reference numeral 120 denotes an awakening timer circuit that is supplied with power directly from the vehicle battery 101. The awakening timer circuit 120 starts a timer operation upon instantaneously receiving a timer operation start instruction signal Dy2 that is generated by the microprocessor 110b. Upon a lapse of a preset, prescribed time, the awakening timer circuit 120 generates an awakening trigger signal Awk, which is supplied to an input of an OR element 162 (described later) and is also supplied to a second input circuit 121, which, in response, supplies a second power control signal Dx2 to the microprocessor 110b.

Reference numeral 130 denotes a memory retention power circuit that is supplied with power directly from the vehicle battery 101. Reference numeral 140 denotes a constant voltage power circuit. Supplied with power from the vehicle battery 101 via the output contact 104a as a first opening/closing element and a reverse-blocking diode 141, the memory retention power circuit 130 generates a constant voltage Vcc of DC 5 V, for example.

The constant voltage power circuit 140 supplies a prescribed regulated voltage to the microprocessor 110b, the devices accompanying the microprocessor 110b such as the program memory 111b, the RAM 114 for computation, and the nonvolatile data memory 115, input/output interface circuits 150, 160, 170, and 180b (described later), and an abnormality storage circuit 190 (described later).

Reference numeral 150 denotes a first input interface circuit that is provided between the first-group input sensors 105 and a digital input port Dx01 of the microprocessor 110b. Reference numeral 151 denotes a bleeder resistor that is provided between the connecting point of the output contact 104a and the reverse-blocking diode 141 and the first-group input sensors 105. The first input interface circuit 150 level-converts DC 12 V as an input signal voltage into DC 5 V and incorporates a capacitor as a noise filter.

Reference numeral 152 denotes an OR circuit that receives, as inputs, a power maintenance drive signal Dy11 and an opening/closing signal Igs of the power switch 102. Reference numeral 153 is a drive transistor that is turned on when the output of the OR circuit 152 has a logical level "H." Reference numeral 154 denotes a reverse connection protective diode that is in series with the drive transistor 153. The coil 104b of the power relay 104 is supplied with power from the vehicle battery 101 via the reverse connection protective diode 154 and the drive transistor 153.

Reference numeral 156 denotes a first input circuit that supplies the opening/closing signal Igs of the power switch 102 to the microprocessor 110b as a first power control signal Dx1. Reference numeral 157 denotes a third input circuit that supplies an opening/closing signal of the output contact 104a to the microprocessor 110b as a third power control signal Dx3.

Reference numeral 160 denotes a second input interface circuit that is provided between the second-group input sensors 106 and a digital input port DxO2 of the microprocessor 110b. Reference numeral 161 denotes a bleeder resistor that is provided between the connecting point of the reverse-blocking diode 141 and the constant voltage power circuit 140 and the first-group input sensors 106. The second input interface circuit 160 level-converts DC 12 V as an input signal voltage into DC 5 V and incorporates a capacitor as a noise filter.

Reference numeral 162 denotes an OR element that receives, as inputs, a power maintenance drive signal Dy12 and the above-mentioned awakening trigger signal Awk. Reference numeral 163 is a drive transistor that is turned on when the output of the OR element 162 has a logical level "H." Reference numeral 164 denotes a reverse connection protective diode that is in series with the drive transistor 163. The coil 103*b* of the power relay 103 is supplied with power from the vehicle battery 101 via the reverse connection protective diode 164 and the drive transistor 163.

The output contact 103*a* as a second opening/closing element is provided between the vehicle battery 101 and the constant voltage power circuit 140. The reverse-blocking diode 141 exists in the circuit from the output contact 103*a* to the vehicle electric loads 108*b* and the alarm/display 109 to prevent power supply along this circuit.

Reference numeral 170 denotes an analog input interface circuit that is provided between the analog input sensors 107 and an analog input port An of the microprocessor 110*b*. Reference symbol 180*b* denotes an output interface circuit that is provided between a digital output port Dy0 of the microprocessor 110*b* and the vehicle electric loads 108*b*. Reference numeral 190 denotes an abnormality storage circuit that is a flip-flop circuit. The set input S of the abnormality storage circuit 190 is connected to an abnormality alarm display signal Dy3 of the microprocessor 110*b*, and its reset input R is connected to are set pulse generation circuit (not shown) that generates a pulse signal PLs when the power switch 102 is turned from off to on. The alarm/display 109 operates when an abnormality has been stored in the abnormality storage circuit 190.

Operation of Embodiment 2 Will be Described.

In the above-configured circuit of FIG. 2, when the power switch 102 is closed, power is supplied from the vehicle battery 101 to the coil 104*b* via the reverse connection protective diode 154 and the drive transistor 153 that has been turned on by the OR circuit 152, whereby the output contact 104*a* of the power relay 104 is closed.

However, if the vehicle battery 101 is set in the opposite way in polarities, the reverse connection protective diode 154 prevents energization of the coil 104*b* and hence the output contact 104*a* is not closed.

When the output contact 104*a* is closed (the vehicle battery 101 is set correctly in polarities), the constant voltage power circuit 140 is activated via the reverse-blocking diode 141 and generates a prescribed constant voltage Vcc, whereupon the microprocessor 110*b* starts to operate.

As a result, first, a power maintenance drive signal Dy11 is generated as a result of functioning of the power maintaining means 112*b*, whereby the drive transistor 153 is kept conductive via the OR circuit 152. Therefore; the relaying state of the power relay 104 is maintained even if the power switch 102 is opened afterwards.

While the power switch 102 is closed and a first power control signal Dx1 that is supplied to the microprocessor 110*b* via the first input circuit 156 has a logical level "H," the microprocessor 110*b* drive-controls the various electric loads 108*b* in accordance with the operation states of the first and second input sensors 105 and 106, the signal voltage levels of the various analog input sensors 107, and the contents of the program memory 111*b*.

However, when the power switch 102 is opened, the logical level of the first power control signal Dx1 is changed from "H" to "L." The microprocessor 110*b* performs save controls, for example, saves part of learned data etc. of the RAM 114 into the nonvolatile memory 115 and returns the operation states of the electric loads 108*b* to initial states, and then causes the power maintaining means 112*b* to stop the output of the power maintenance drive signal Dy11.

As a result, the drive transistor 153 is turned off and power relay 104 is de-energized. The output voltage of the constant voltage power circuit 140 disappears and the microprocessor 110*b* stops its operation.

However, immediately before the output of the power maintenance drive signal Dy11 is stopped, the awakening control means 113*b* causes generation of a timer operation start instruction signal Dy2 and the awakening timer circuit 120 is thereby prepared for a start of a timer operation.

Therefore, upon a lapse of a preset time of the awakening timer circuit 120 from the stop of operation of the microprocessor 110*b*, the awakening timer circuit 120 generates an awakening trigger signal Awk, whereupon the coil 103*b* of the second power relay 103 is supplied with power via the drive transistor 163 that has been turned on by the OR element 162 and the output contact 103*a* as the second opening/closing element is turned on.

As a result, power is supplied from the vehicle battery 101 to the constant voltage power circuit 140 via the output contact 103*a*. The constant voltage power circuit 140 generates a prescribed constant voltage Vcc, whereby the microprocessor 110*b* starts to operate.

The microprocessor 110*b* thus supplied with power judges that an awakening operation state is established on the basis of the facts that the first power control signal Dx1 has a logical level "L" (i.e., the power switch 102 is off) and that the second power control signal Dx2 has a logical level "H." First, the microprocessor 110*b* generates a power maintenance drive signal Dy12 so that the second power relay 103 will be kept activated by the OR element 162 and the drive transistor 163 even after the output of the awakening trigger signal Awk is stopped.

Then, the microprocessor 110*b* stores states of predetermined, particular input signals in the RAM 114 and judges whether to perform an awakening operation again.

After reading and storing the states of the particular input signals and performing the judgment processing, the microprocessor 110*b* stops the output of the power maintenance drive signal Dy12. Since the drive transistor 163 is turned off, the output of the constant voltage power circuit 140 disappears and hence the microprocessor 110*b* stops its operation.

However, if it is necessary to perform an awakening operation again, the microprocessor 110*b* generates a timer operation start instruction signal Dy2 and thereby starts operation of the awakening timer circuit 120 immediately before stopping the output of the power maintenance drive signal Dy12.

In this embodiment, since the bleeder resistor 161 is located at such a position as to be supplied with power from the output contact 103*a*, operation states of the second group input sensors 106 can be read at the stage of an awakening operation.

In contrast, as for the first-group input sensors 105 that need not be monitored during an awakening operation, the reverse-blocking diode 141 prevent power supply to the bleeder resistor 151.

On the other hand, when the power switch 102 has been opened, the logical level of the first power control input signal Dx1 has been changed to "L," and the output of the power maintenance drive signal Dy11 has stopped, the power relay 104 should be de-energized and the output contact 104*a* should be opened. However, if the output contact 104*a* is kept conductive because of welding, the power supply to the constant voltage power circuit 140 is maintained and the third power control signal Dx3 having a logical level "H" is kept input to the microprocessor 110*b* via the third input circuit 157.

In response to the occurrence of this abnormal state, the microprocessor 110b cooperates with the alarming/displaying means 116 to generate an abnormality alarm display signal Dy3 and thereby causes operation of the alarm/display 109 via the abnormality storage circuit 190.

(3) Features of Configuration and Advantages of Embodiment 2

As is understood from the above description, the power circuit according to the second embodiment of the invention is a power circuit of the vehicular electronic control unit 100b having the microprocessor 110b that is supplied with power from the vehicle battery 101 and that drives the various electric loads 108b in accordance with the operation states of the first and second input sensors 105 and 106 that generate on/off signals or the various input sensors 107 that generate analog signals and the contents of the program memory 111b. The vehicular electronic control unit 100b is provided with the constant voltage power circuit 140, the awakening timer circuit 120, and first and second power supply circuits.

The constant voltage power circuit 140 is supplied with power from the vehicle battery 101 via the first opening/closing element (i.e., output contact 104a; part of the first power supply circuit) or the second opening/closing element (i.e., output contact 103a; part of the second power supply circuit), and supplies a prescribed regulated voltage to the microprocessor 110b, the devices accompanying the microprocessor 110b such as the program memory 111b, the RAM 114 for computation, and the nonvolatile data memory 115, the input/output interface circuits 150, 160, 170, and 180b, and the abnormality storage circuit 190.

The awakening timer circuit 120 is supplied with power directly from the vehicle battery 101 and generates an awakening trigger signal Awk upon a lapse of a prescribed time from a stop of power supply to the microprocessor 110b. The awakening timer circuit 120 employs power-saving-type circuit elements.

The first power supply circuit is provided with the power relay 104 having the output contact 104a (i.e., first opening/closing element) provided between the vehicle battery 101 and the constant voltage power circuit 140/various electric loads 108b and the coil 104b for closing the output contact 104a, and the reverse-blocking diode 141 that is connected in series to the output contact 104a. The coil 104b is energized when the power switch 102 is closed, that is, manipulated at a start of driving of the vehicle. Even if the power switch 102 is opened, the coil 104b is kept energized by a power maintenance drive signal Dy11 that is generated by the microprocessor 10b.

The second power supply circuit is provided with the second power relay 103 having the output contact 103a (i.e., second opening/closing element) that at least connects the vehicle battery 101 and the constant voltage power circuit 140 and the coil 103b for closing the output contact 103a. The coil 103a is energized when an awakening trigger signal Awk is generated, and is kept energized by a power maintenance drive signal Dy12 that is generated by the microprocessor 110b.

The reverse-blocking diode 141 is in such a connection relationship as to allow power supply to the various electric loads 108b via the output contact 104a which is part of the first power supply circuit and to prevent power supply to the various electric loads 108b via the output contact 103a which is part of the second power supply circuit.

Therefore, during a driving operation of the vehicular electronic control unit 110b, the vehicular electronic control unit 100b and the vehicle electric loads 108b are supplied with power from the single power relay 104. That is, the power circuit is not configured so as to supply power to one of the vehicular electronic control unit 100b and the vehicle electric loads 108b from the power relay 104. Further, when the vehicular electronic control unit 100b is activated in a state that the power switch 102 is off, the vehicle electric loads 108b are not supplied with power.

Further, since the second power relay 103 is used as the second opening/closing element, the degree of power generation is lower than in the case of using a transistor and the leakage current during opening of the output contact 103a is small.

Further, in the vehicular electronic control unit 100b according to the second embodiment of the invention, first and second power control signals Dx1 and Dx2 are input to the microprocessor 110b and the program 112b as the power maintaining means is stored in the program memory 111b.

The first power control signal Dx1 is an opening/closing signal Igs of the power switch 102 and the second power control signal Dx2 is an awakening trigger signal Awk that is generated by the awakening timer circuit 120. When the power switch 102 is opened, the power maintaining means 112b causes generation of a power maintenance drive signal Dy11 for keeping the power supply through the first power supply circuit during a first period that is necessary for save control processing of the microprocessor 110b. While the power switch 102 is off, the power maintaining means 112b causes generation of a power maintenance drive signal Dy12 for keeping the power supply through the second power supply circuit during a second period for monitoring of the states of particular input signals.

Judging whether the current state is a delayed power shutoff state or an awakening power supply state during a power shutoff on the basis of the first and second power control signals Dx1 and Dx2, the microprocessor 110b can cause the power maintaining means 112b to cause generation of a proper power maintenance drive signal Dy11 or Dy12.

Still further, in the vehicular electronic control unit 100b according to the second embodiment of the invention, the microprocessor 110b inputs a timer operation start instruction signal Dy2 to the awakening timer circuit 120 and the program 113b as the awakening control means is stored in the program memory 111b.

The awakening control means 113b causes the next awakening operation by causing generation of a timer operation start instruction signal Dy2 immediately before a stop of generation of a power maintenance drive signal Dy11 or Dy12, and prohibits a subsequent awakening operation by stopping generation of a timer operation start instruction signal Dy2 in accordance with monitoring results of the above-mentioned particular input signals.

If judging that an awakening operation need not be performed, the microprocessor 110b disables operation of the second power supply circuit, whereby the consumption of power supplied from the vehicle battery 101 can be reduced.

Further, in the vehicular electronic control unit 100b according to the second embodiment of the invention, the various input sensors 105 and 106 are separately connected to the microprocessor 110b via the first and second input interface circuits 150 and 160.

The first-group input sensors 105 that are connected to the first input interface circuit 150 are also connected to the first power supply circuit. The first-group input sensors 105 are a group of sensors that need not be monitored while the power switch 102 is off.

The second-group input sensors 106 that are connected to the second input interface circuit 160 are also connected to the second power supply circuit. The second-group input sensors 106 are a group of sensors that need to be monitored while the power switch 102 is off or a group of sensors whose current consumption is very small though they need not be monitored while the power switch 102 is off.

With this measure, the consumption of power supplied from the vehicle battery 101 during the awakening operation for input monitoring can be reduced.

Furthermore, in the vehicular electronic control unit 100b according to the second embodiment of the invention, the program memory 111b contains the program 116 as the alarming/displaying means. The alarming/displaying means 116 causes the abnormality storage circuit 190 to operate and thereby announces occurrence of an abnormality using the alarm/display 109 if the output contact 104a of the power relay 104 is closed in a state that the power switch 102 is off and a power maintenance drive signal Dy11 is not generated.

Therefore, if an welding abnormality has occurred in the output contact 104a, the alarm/display 109 is activated and the occurrence of the abnormality is thereby announced with only a short delay from, that is, immediately after, turning-off of the power switch 102 by the driver. An abnormal discharge of the vehicle battery 101, resulting burning damage, or a like accident can be prevented.

What is claimed is:

1. A power circuit of a vehicular electronic control unit including a microprocessor for driving various electric loads in accordance with operation states of various input sensors and contents of a program memory, the power circuit comprising a constant voltage power circuit, an awakening timer circuit, and first and second power supply circuits each of which is supplied with power from a vehicle battery, wherein:

the constant voltage power circuit is supplied with power from the vehicle battery via the first or second power supply circuit;

the awakening timer circuit generates an awakening trigger signal upon a lapse of a prescribed time from a stop of power supply to the microprocessor;

the first power supply circuit comprises an output contact as a first opening/closing element and a coil for closing the output contact; and the second power supply circuit comprises a second opening/closing element that is provided between the vehicle battery and the constant voltage power circuit and is closed in response to the awakening trigger signal.

2. A power circuit of a vehicular electronic control unit including a microprocessor that is supplied with power from a vehicle battery and drives various electric loads in accordance with operation states of various input sensors and contents of a program memory, the power circuit comprising:

a constant voltage power circuit that is supplied with power from the vehicle battery via the first or second power supply circuit, and that supplies a prescribed regulated voltage to the microprocessor, devices accompanying the microprocessor including the program memory and a RAM for computation, and input/output interface circuits;

an awakening timer circuit that is supplied with power directly from the vehicle battery, and generates an awakening trigger signal upon a lapse of a prescribed time from a stop of power supply to the microprocessor;

a first power supply circuit that comprises a power relay having an output contact as a first opening/closing element provided between the vehicle battery and the constant voltage power circuit or between and the vehicle battery and the various electric loads, and a coil for closing the output contact, and a reverse-blocking diode connected in series to the output contact, wherein the coil being energized when a power switch is turned on and kept energized by a power maintenance drive signal generated by the microprocessor even if the power switch is turned off; and a second power supply circuit comprises a second opening/closing element that connects the vehicle battery and the constant voltage power circuit, and is closed in response to the awakening trigger signal and kept closed by a power maintenance drive signal generated by the microprocessor, wherein the reverse-blocking diode is in such a connection relationship as to allow power supply from the first power supply circuit to the various electric loads and to prohibit power supply from the second power supply circuit to the various electric loads.

3. The power circuit of a vehicular electronic control unit according to claim 1, wherein the vehicular electronic control unit is housed in a case, the power relay is disposed outside the case, and the second opening/closing element is a transistor that is disposed inside the case.

4. A power circuit of a vehicular electronic control unit comprising a microprocessor that is supplied with power from a vehicle battery and drives various electric loads in accordance with operation states of various input sensors and contents of a program memory, the power circuit comprising:

a constant voltage power circuit that is supplied with power from the vehicle battery via the first or second power supply circuit, and that supplies a prescribed regulated voltage to the microprocessor, devices accompanying the microprocessor including the program memory and a RAM for computation, and input/output interface circuits;

an awakening timer circuit that is supplied with power directly from the vehicle battery, and generates an awakening trigger signal upon a lapse of a prescribed time from a stop of power supply to the microprocessor;

a first power supply circuit that comprises a power relay having an output contact as a first opening/closing element provided between the vehicle battery and the constant voltage power circuit or between and the vehicle battery and the various electric loads, and a coil for closing the output contact, and a reverse-blocking diode connected in series to the output contact, wherein the coil being energized when a power switch that is manipulated to start driving of a vehicle is turned on and kept energized by a power maintenance drive signal generated by the microprocessor even if the power switch is turned off; and a second power supply circuit comprises a second power relay having an output contact as a second opening/closing element provided between the vehicle battery and the constant voltage power circuit, and a coil for closing the output contact, wherein the coil being energized in response to the awakening trigger signal and kept energized by a power maintenance drive signal generated by the microprocessor, wherein the reverse-blocking diode is in such a connection relationship as to allow power supply from the first power supply circuit to the various electric loads and to prohibit power supply from the second power supply circuit to the various electric loads.

5. The power circuit of a vehicular electronic control unit according to claim 1, wherein first and second power control signals are input to the microprocessor, a program as power maintaining means is stored in the program memory, the first power control signal are an opening/closing signal of the power switch, and the second power control signal is the awakening trigger signal generated by the awakening timer circuit, and wherein the power maintaining means generates, when the power switch is opened, a power maintenance drive signal for keeping power supply through the first power supply circuit during a first period that is necessary for save control processing of the microprocessor, and while the power switch is off, the power maintaining means generates a power maintenance drive signal for keeping power supply through the second power supply circuit during a second period for monitoring of a state of a particular input signal.

6. The power circuit of a vehicular electronic control unit according to claim 5, wherein a timer operation start instruction signal is input from the microcomputer to the awakening timer circuit and a program as awakening control means is stored in the program memory, and wherein the awakening control means causes a next awakening operation by causing generation of the timer operation start instruction signal immediately before a stop of generation of the power maintenance drive signal, and prohibits a subsequent awakening operation by stopping generation of the timer operation start instruction signal in accordance with a monitoring result of the particular input signal.

7. The power circuit of a vehicular electronic control unit according to claim 5, wherein the power maintenance drive signal is output to the first and second power supply circuits from a common output port of the microprocessor and the power circuit further comprises an AND circuit and an OR circuit, and wherein the AND circuit generates a first logical signal when the output contact as the first opening/closing element is closed and the power maintenance drive signal is generated, the OR circuit calculates OR of the first logical signal and a second logical signal that is generated when the power switch is closed, and the coil of the power relay is energized by a resulting OR signal of the OR circuit.

8. The power circuit of a vehicular electronic control unit according to claim 4, wherein the various input sensors are separately connected to the microprocessor through first and second input interface circuits, wherein first-group input sensors that are connected to the first input interface circuit are also connected to the first power supply circuit and are a group of sensors that need not be monitored while the power switch is off, and wherein second-group input sensors that are connected to the second input interface circuit are also connected to the second power supply circuit and are a group of sensors that need to be monitored while the power switch is off or a group of sensors whose current consumption is very small though they need not be monitored while the power switch is off.

9. The power circuit of a vehicular electronic control unit according to claim 4, wherein a program as alarming/displaying means is stored in the program memory, and wherein the alarming/displaying means causes an abnormality storage circuit to operate and thereby announces occurrence of an abnormality using an alarm/display if the output contact as the first opening/closing element is closed in a state that the power switch is off and the power maintenance drive signal is not generated.

* * * * *